(12) United States Patent
Callanan et al.

(10) Patent No.: US 8,218,345 B2
(45) Date of Patent: Jul. 10, 2012

(54) RECTIFIER WITH SIC BIPOLAR JUNCTION TRANSISTOR RECTIFYING ELEMENTS

(75) Inventors: Robert Joseph Callanan, Raleigh, NC (US); Fatima Husna, Morrisville, NC (US)

(73) Assignee: Cree, Inc., Durham, NC (US)

( * ) Notice: Subject to any disclaimer, the term of this patent is extended or adjusted under 35 U.S.C. 154(b) by 404 days.

(21) Appl. No.: 12/408,304

(22) Filed: Mar. 20, 2009

(65) Prior Publication Data
US 2010/0238692 A1   Sep. 23, 2010

(51) Int. Cl.
    *H02M 7/217*   (2006.01)
(52) U.S. Cl. .......................... 363/89; 363/127
(58) Field of Classification Search ............ 363/81, 363/84, 89, 125, 127
    See application file for complete search history.

(56) References Cited

U.S. PATENT DOCUMENTS

| | | | |
|---|---|---|---|
| 3,582,758 A | | 6/1971 | Gunn |
| 4,158,882 A | | 6/1979 | Citta |
| 4,333,141 A | | 6/1982 | Nagano |
| 4,716,514 A | * | 12/1987 | Patel ............................ 363/127 |
| 4,941,080 A | | 7/1990 | Sieborger |
| 6,597,210 B2 | * | 7/2003 | Carsten ........................ 327/108 |
| 7,190,143 B2 | | 3/2007 | Wei et al. |
| 7,787,270 B2 | * | 8/2010 | NadimpalliRaju et al. ..... 363/68 |
| 2002/0064060 A1 | | 5/2002 | Huang |

OTHER PUBLICATIONS

Notification of Transmittal of the International Search Report and the Written Opinion of the International Searching Authority, or the Declaration; International Search Report; Written Opinion of the International Searching Authority, PCT Application No. PCT/US2010/050060, Aug. 4, 2010.

Cooper et al. "SiC Power-Switching Devices—The Second Electronics Revolution?" *Proceedings of the IEEE* 90(6):956-968 (Jun. 1, 2002).

TranSiC "SiC BJT serves 20-A power needs"; (May 20, 2008) retrieved Jul. 19, 2010 from URL:http://www2.electronicproducts.com/SiC_BJT_serves_20-A_power_needs-article-cspo04_jul2008-html.aspx.

* cited by examiner

*Primary Examiner* — Gary L Laxton
(74) *Attorney, Agent, or Firm* — Myers Bigel Sibley & Sajovec, P.A.

(57) ABSTRACT

A rectifier circuit can include an input circuit and first and second silicon carbide (SiC) bipolar junction transistors (BJTs). The input circuit is configured to respond to an alternating current (AC) input signal by generating a first pair of opposite polarity AC signals and a second pair of opposite polarity AC signals. The first pair of AC signals has a greater voltage range than the second pair of AC signals. The first and second SiC BJTs each include an input terminal connected to receive a different one of the second pair of opposite polarity AC signals, a base terminal connected to receive a different one of the first pair of opposite polarity AC signals, and an output terminal connected to a rectified signal output node of the rectifier circuit. The input circuit is further configured to control the first and second SiC BJTs through the first and second pairs of opposite polarity AC signals to forward bias the first SiC BJT while reverse biasing the second SiC BJT during a first half cycle of the AC input signal and to reverse bias the second SiC BJT while forward biasing the second SiC BJT during a second half cycle of the AC input signal.

21 Claims, 5 Drawing Sheets

RECTIFIER WITH SIC BIPOLAR JUNCTION TRANSISTOR RECTIFYING ELEMENTS

STATEMENT OF U.S. GOVERNMENT INTEREST

This invention was made with Government support under Army Research Laboratory Contract No. W911NF-04-2-0022. The Government has certain rights in the invention.

FIELD OF THE INVENTION

The present invention relates to power conversion and, more particularly, to rectifier circuits that convert alternating current into direct current.

BACKGROUND

Full wave rectifier circuits convert alternating-current (AC) into direct-current (DC). Some rectifier circuits include a pair diodes that are configured to function as rectifying elements by alternately conducting in a complementary manner to each other responsive to positive and negative half-cycles of an AC input signal. The efficiency of such full wave rectifier circuits can be limited by the threshold forward voltage (about 0.3 V) for the diodes to become conductive. For low voltage applications, the threshold forward voltages of the diodes may result in an unacceptable loss of efficiency.

Some full wave rectifier circuits further include MOSFET transistors that are connected across the diodes to assist with rectification of the AC input signal. Although the MOSFETs can reduce the forward conduction losses through the rectifier, the complexity and cost of the additional MOSFET circuitry may be unacceptable. Moreover, when implemented in silicon, the diodes and MOSFETs may be limited to temperature ranges (e.g., below about 175° C.) that can be unacceptable for some applications.

SUMMARY

In some embodiments of the present invention, a rectifier circuit includes a silicon carbide (SiC) bipolar junction transistor (BJT) circuit having an output connected to a rectified signal output node of the rectifier circuit. The SiC BJT circuit may include one or more SiC BJTs. The input circuit is connected to an input of the SiC BJT circuit and configured to respond to an alternating current (AC) input signal by forward biasing the SiC BJT circuit during a first half cycle of the AC input signal and to reverse bias the SiC BJT circuit during a second half cycle of the AC input signal to cause the SiC BJT circuit to generate a rectified output signal through the rectified signal output node during at least the first half cycle of the AC input signal.

In some further embodiments, the input circuit is configured to respond to the AC input signal by generating a first pair of opposite polarity AC signals and a second pair of opposite polarity AC signals. The first pair of AC signals has a greater voltage range than the second pair of AC signals. The SiC BJT circuit comprises first and second SiC BJTs that each include an input terminal connected to receive a different one of the second pair of opposite polarity AC signals, a base terminal connected to receive a different one of the first pair of opposite polarity AC signals, and an output terminal connected to a rectified signal output node of the rectifier circuit. The input circuit is further configured to control the first and second SiC BJTs through the first and second pairs of opposite polarity AC signals to forward bias the first SiC BJT while reverse biasing the second SiC BJT during a first half cycle of the AC input signal and to reverse bias the second SiC BJT while forward biasing the second SiC BJT during a second half cycle of the AC input signal. Accordingly, the rectifier circuit may provide full wave rectification of the AC input signal at the rectifier signal output node.

In some other embodiments of the present invention, a rectifier circuit includes first and second SiC BJTs and first, second, and third transformers. The first and second SiC BJTs each include an input terminal, a base terminal, and an output terminal. The first transformer responds to an AC input signal by generating a pair of opposite polarity AC signals. The input terminals of the first and second SiC BJTs are connected to receive a different one of the opposite polarity AC signals from the first transformer. The second transformer responds to a signal from the output terminal of the first SiC BJT by generating a voltage across the base terminal and the input terminal of the first SiC BJT. The third transformer responds to a signal from the output terminal of the second SiC BJT by generating a voltage across the base terminal and the input terminal of the second SiC BJT. The output terminals of the first and second SiC BJTs are connected through the first and second transformers to a rectified signal output node of the rectifier circuit.

In some other embodiments of the present invention, a rectifier circuit includes first and second SiC BJTs and first, second, third transformers. The first and second SiC BJTs each including an input terminal, a base terminal, and an output terminal. The first transformer responds to an AC input signal by generating a first pair of opposite polarity AC signals and a second pair of opposite polarity AC signals. The first pair of AC signals has a greater voltage range than the second pair of AC signals. The input terminals of the first and second SiC BJTs are connected to receive a different one of the second pair of opposite polarity AC signals. The base terminals of the first and second SiC BJTs are connected to receive a different one of the first pair of opposite polarity AC signals. The second transformer responds to a signal from the output terminal of the first SiC BJT by generating a voltage across the base terminal and the input terminal of the first SiC BJT. The third transformer responds to a signal from the output terminal of the second SiC BJT by generating a voltage across the base terminal and the input terminal of the second SiC BJT. The output terminals of the first and second SiC BJTs are connected through the first and second transformers to a rectified signal output node of the rectifier circuit.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
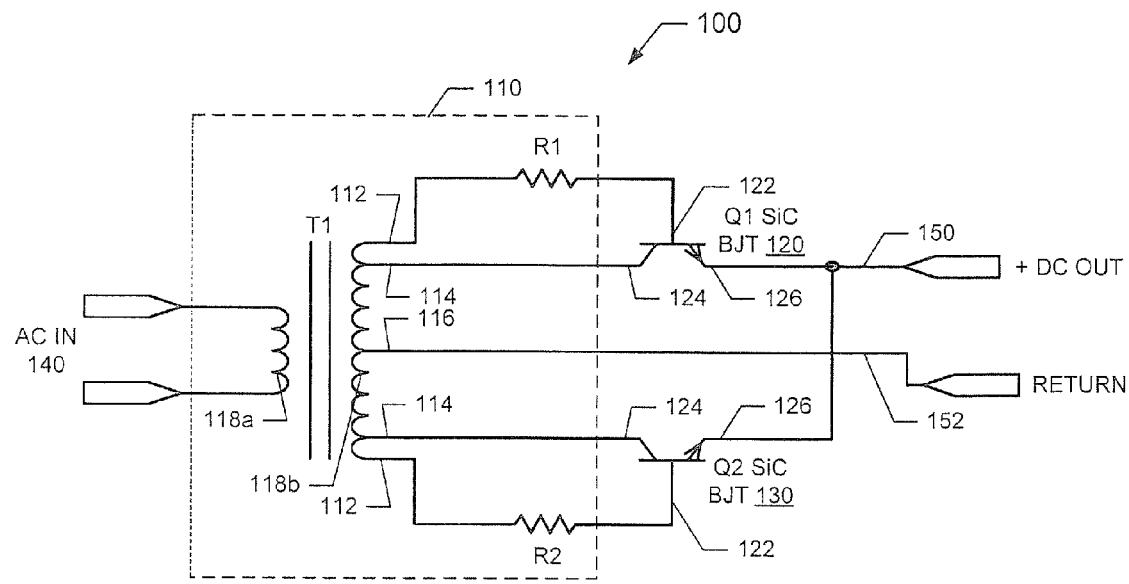
FIG. 1 is a schematic diagram of a full wave rectifier circuit that uses silicon carbide bipolar junction transistors as rectifying elements in accordance with some embodiments of the present invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Some embodiments of the invention are described with reference to semiconductor layers and/or regions which are characterized as having a conductivity type such as n-type or p-type, which refers to the majority carrier concentration in the layer and/or region. Thus, n-type material has a majority equilibrium concentration of negatively charged electrons, while p-type material has a majority equilibrium concentration of positively charged holes.

Various embodiments of the present invention may arise from the present realization that full wave rectifier circuits can be constructed using silicon carbide (SiC) bipolar junction transistors (BJTs) as rectifying elements, which may substantially improve efficiency of the circuit when rectifying low voltage AC signals, reduce circuit complexity, and/or may enable higher temperature operation compared to full wave rectifier circuits that use Si Schottky diodes or Si MOSFETs as a rectifying element.

FIG. 1 is a schematic diagram of a full wave rectifier circuit 100 that uses SiC BJTs as rectifying elements in accordance with some embodiments of the present invention. Referring to FIG. 1, the rectifier circuit 100 includes an input circuit 110 and a pair of SiC BJTs 120 (Q1) and 130 (Q2). The exemplary SiC BJTs 120 and 130 are NPN type transistors that are each formed with a P-doped base region and adjacent N-doped collector and emitter regions in a SiC substrate. The SiC BJTs 120 and 130 further include a base terminal 122 that is connected to the base region, a collector terminal 124 that is connected to the collector region, and an emitter terminal 126 that is connected to the emitter region.

Although various embodiments are described in the context of NPN type SiC BJTs 120 and 130 rectifying elements, the invention is not limited thereto as other embodiments may be configured using PNP type SiC BJTs having an N-doped base region and P-doped collector and emitter regions in a SiC substrate.

The input circuit 110 may include a transformer T1 that includes an input primary winding 118a that is connected to receive the AC input signal 140 and an output secondary winding 118b with a first pair of tap nodes 112, a second pair of tap nodes 114, and a center tap node 116. In response to the AC input signal 140 being applied to the input primary winding 118a, the output secondary winding 118b generates a pair of opposite polarity AC signals (e.g., 180° out of phase to each other) between the first pair of tap nodes 112 and the center tap node 116, and generates another pair of opposite polarity AC signals between the second pair of tap nodes 114 and the center tap node 116. The AC signals between the first tap nodes 112 and the center tap node 116 have a greater voltage range than the AC signals between the second tap nodes 114 and the center tap node 116.

The first pair of tap nodes 112 of the output secondary winding 118b can be configured to generate the first pair of AC signals with about an equal voltage range relative to a voltage of the center tap node 116, and the second pair of tap nodes 114 of the output secondary winding 118b can be configured to generate the second pair of AC signals with about an equal voltage range relative to the voltage of the center tap node 116.

For the SiC BJT 120, the collector terminal 124 is connected to receive the AC signal from one of the second pair of tap nodes 114, the base terminal 122 is connected through a resistor R1 to receive the AC signal from one of the first pair of tap nodes 112, and the emitter terminal 126 is connected to a rectified signal output node 150 of the full wave rectifier circuit 100. For the other SiC BJT 130, the collector terminal 124 is connected to receive the AC signal from the other one of the second pair of tap nodes 114, the base terminal 122 is connected through a resistor R2 to receive the AC signal from the other one of the first pair of tap nodes 112, and the emitter terminal 126 is connected to the rectified signal output node 150. The center tap node 116 is connected to a return rectified signal node 152.

The resistance values of resistors R1 and R2 and the location of the first and second pairs of tap nodes 112 and 114 within the output secondary winding 118b are selected to forward bias the SiC BJT 120 to generate a positive voltage at the rectified signal output node 150 while reverse biasing the other SiC BJT 130 during a first half cycle of the AC input signal 140, and to reverse bias the SiC BJT 120 while forward biasing the other SiC BJT 130 to generate a positive voltage at the rectified signal output node 150 during a second half cycle of the AC input signal 140.

Moreover, the resistors R1 and R2 and the location of the first and second pairs of tap nodes 112 and 114 can be configured to saturate the SiC BJT 120 while reverse biasing the other SiC BJT 130 during a major portion of the first half cycle of the AC input signal 140, and to reverse bias the SiC BJT 120 while saturating the other SiC BJT 130 during a major portion of the second half cycle of the AC input signal 140. For example, the transformer T1 may generate base to emitter voltages within a range of −5V to +5V during cycles of the AC input signal 140 to alternately saturate and then reverse bias the SiC BJTs 120 and 130.

For example, during one half cycle of the AC input signal 140, the tap nodes 112 and 114 of transformer T1 provide a positive voltage to forward bias the collector-to-base junction of the SiC BJT 120. The resistor R1 limits the current into the base 122 of the SiC BJT 120. The collector-to-emitter voltage of SiC BJT 120 may be reduced or minimized by the combination of forward bias on the collector-to-base junction and the emitter-to-base junction. This biasing forces SiC BJT 120 into hard saturation and thereby reduces or minimizes the collector-to-emitter voltage of SiC BJT 120. During this one half cycle of the AC input signal 140, the tap nodes 112 and 114 of transformer T1 provide a strong negative bias to the emitter-to-base junction and to the collector-to-base junction of SiC BJT 130, thereby forcing it deeply into cutoff. In contrast, during the second half cycle of the AC input signal 140, the tap nodes 112 and 114 of transformer T1 reverse this process, causing SiC BJT 130 to be driven into hard saturation and forcing SiC BJT 120 deeply into cutoff.

Accordingly, the full wave rectifier circuit 100 rectifies the AC input signal 140 to generate a rectified (e.g., DC) signal that is output through the rectified signal output node 150 (e.g., +DC) and is received back through the return rectified signal node 152 (e.g., −DC). The full wave rectifier circuit 100 may be included as part of a power supply to supply a DC signal across nodes 150 and 152 to an external load, such as to electronic circuitry that requires a DC signal for operation. Because the rectifier circuit 100 uses SiC BJTs 120 and 130 as rectifier elements, it may provide higher efficiency signal rectification, may use less circuit elements, and/or may enable operation at higher temperatures than conventional rectifier circuits that use Si Schottky diodes and/or Si MOSFETs. Because the SiC BJTs 120 and 130 are biased using a voltage difference between the tap nodes 112 and 114, the rectifier circuit 100 may be particularly suited for generating lower current rectified signals.

Figure 2:
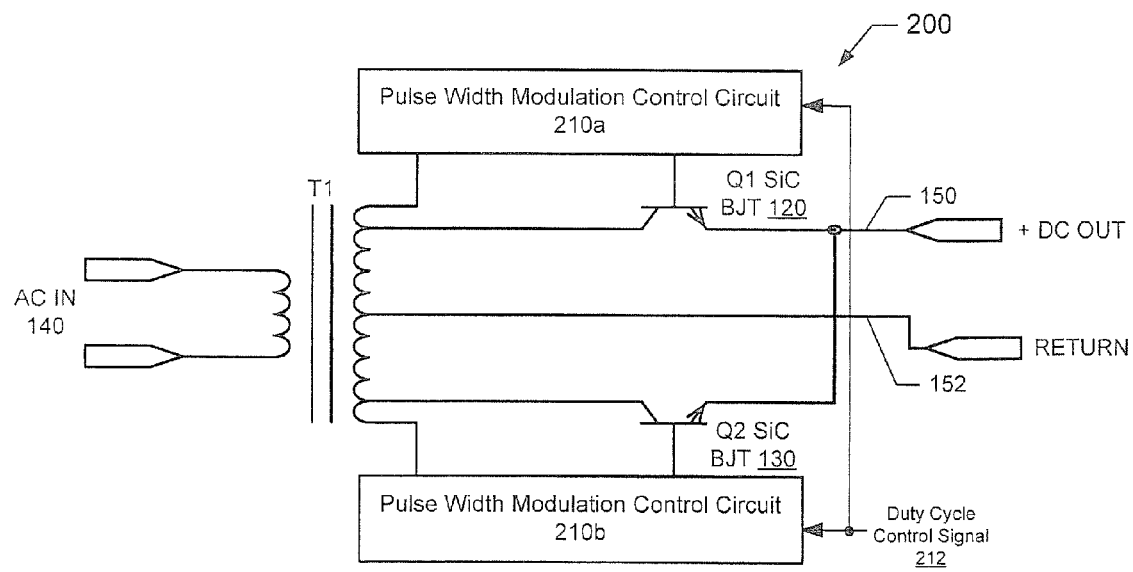
FIG. 2 is a schematic diagram of a full wave rectifier circuit that uses silicon carbide bipolar junction transistors as rectifying elements in accordance and that further includes pulse width modulation control according to some embodiments of the present invention.

FIG. 2 is a schematic diagram of another full wave rectifier circuit 200 that may be similar to that shown for the rectifier circuit 100 of FIG. 1, but, in contrast thereto, includes pulse width modulation control circuits 210a and 210b. The pulse width modulation (PWM) control circuits 210a and 210b respond to a duty cycle control signal 212 by regulating a duty cycle between a first mode when the SiC BIT 120 is forward biased (and may be driven into a saturated state) and the other SiC BIT 130 is reverse biased and a second mode when the SiC BJT 120 is reverse biased and the other SiC BJT 130 is forward biased (and may be driven into a saturated state). The PWM control circuits 210a and 210b are connected to control the base to collector biasing of the SiC BJTs 120 and 130 in response to the duty cycle control signal 212. The duty cycle of the SiC BJTs 120 and 130 may be controlled by the PWM control circuits 210a and 210b by waiting for the AC signals (e.g., signals 112 or 114) from the transformer (T1) to reach one or more threshold values that are defined therein before controlling the SiC BJTs 120 and 130 to switch between the first and second modes.

Although separate PWM control circuits 210a and 210b have been shown in FIG. 2 for ease of illustration, it is to be understood that their functionality may be combined within a single element or spread across more than two circuit elements.

Figure 3:
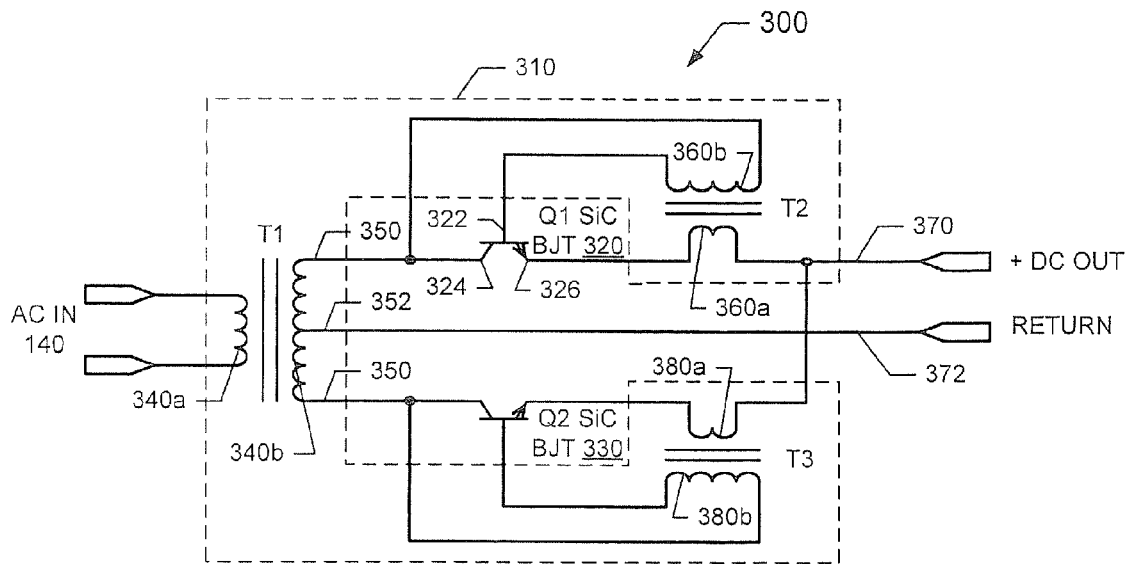
FIG. 3 is a schematic diagram of a full wave rectifier circuit that uses silicon carbide bipolar junction transistors as rectifying elements in accordance with some embodiments of the present invention.

FIG. 3 is a schematic diagram of another full wave rectifier circuit 300 that uses SiC BJTs as rectifying elements in accordance with some embodiments of the present invention. Referring to FIG. 3, the rectifier circuit 300 includes a pair of SiC BJTs 320 (Q1) and 330 (Q2) and an input circuit 310 that may include three transformers T1, T2, and T3. The exemplary SiC BJTs 320 and 330 are NPN type transistors that are each formed with a P-doped base region and adjacent N-doped collector and emitter regions in a SiC substrate. The SiC BJTs 320 and 330 each include a base terminal 322 that is connected to the base region, a collector terminal 324 that is connected to the collector region, and an emitter terminal 326 that is connected to the emitter region.

Although various embodiments are described in the context of NPN type SiC BJTs 320 and 330 rectifying elements, the invention is not limited thereto as other embodiments may be configured using PNP type SiC BJTs having an N-doped base region and P-doped collector and emitter regions in a SiC substrate.

The first transformer T1 includes an input primary winding 340a that is connected to receive the AC input signal 140 and an output secondary winding 340b with a first pair of tap nodes 350 and a center tap node 352. In response to the AC input signal 140 being applied to the input primary winding 340a, the output secondary winding 340b generates a pair of opposite polarity AC signals (e.g., 180° out of phase to each other) between the tap nodes 350 and the center tap node 352. The center tap node 352 is connected to a return rectified signal node 372 of the full wave rectifier circuit 300. The collector of each of the SiC BJTs 320 and 330 is connected to a different one of the tap nodes 350.

The second transformer T2 includes an input primary winding 360a that is connected between the emitter 326 of the SiC BJT 320 and a rectified signal output node 370 of the full wave rectifier circuit 300. The input primary winding 360a responds to a signal from the emitter 326 of the SiC BJT 320 by generating a voltage across an output secondary winding 360b. The base terminal 322 and the collector terminal 324 of the SiC BJT 320 are connected to receive the voltage from the output secondary winding 360b of the second transformer T2.

The third transformer T3 includes an input primary winding 380a that is connected between the emitter 326 of the other SiC BJT 330 and the rectified signal output node 370. The input primary winding 380a responds to a signal from the emitter 326 of the SiC BJT 330 by generating a voltage across an output secondary winding 380b. The base terminal 322 and the collector terminal 324 of the SiC BJT 330 are connected to receive the voltage from the output secondary winding 360b of the second transformer T2.

The transformers T1 and T2 are configured as current transformers, with each one responding to respective transistor emitter current to create feedback into the transistor base. Collectively, the transformers T1, T2, and T3 are configured to forward bias the SiC BJT 320 while reverse biasing the other SiC BJT 330 during a first half cycle of the AC input signal 140 and to reverse bias the SiC BJT 320 while forward biasing the other SiC BJT 330 during a second half cycle of the AC input signal 140. The turns ratio of the transformers T2 and T3 can be selected to be less than the current gain of the respective SiC BJTs 320 and 330, which may ensure that adequate base current is supplied to the SiC BJTs 320 and 330 to place them in hard saturation when forward biased.

For example, the transformers T1, T2, and T3 may be further configured to hard saturate the SiC BJT 320 while reverse biasing the other SiC BJT 330 into cutoff during a major portion of the first half cycle of the AC input signal 140, and to reverse bias the SiC BJT 320 into cutoff while hard saturating the other SiC BJT 330 during a major portion of the second half cycle of the AC input signal 140. For example, the transformers T2 and T3 may generate base to emitter voltages within a range of −5V to +5V during cycles of the AC input signal 140 to alternately hard saturate and then cutoff the SiC BJTs 320 and 330.

Accordingly, the full wave rectifier circuit 330 rectifies the AC input signal 140 to generate a rectified (e.g., DC) signal that is output through the rectified signal output node 370 (e.g., +DC) and is received back through the return rectified signal node 372 (e.g., −DC). The full wave rectifier circuit 100 may be included as part of a power supply to supply a DC signal across nodes 150 and 152 to an external load, such as to electronic circuitry that requires a DC signal for operation. Because the rectifier circuit 300 uses SiC BJTs 120 and 130 as rectifier elements, it may provide higher efficiency signal rectification, may use less circuit elements, and/or may enable operation at higher temperatures conventional rectifier circuits that use Si Schottky diodes and/or Si MOSFETs. Because the SiC BJTs 320 and 330 are biased using voltages across the transformers T2 and T3, the rectifier circuit 300 may be particularly suited for generating higher current rectified signals compared to the rectifier circuit 100 of FIG. 1.

Figure 4:
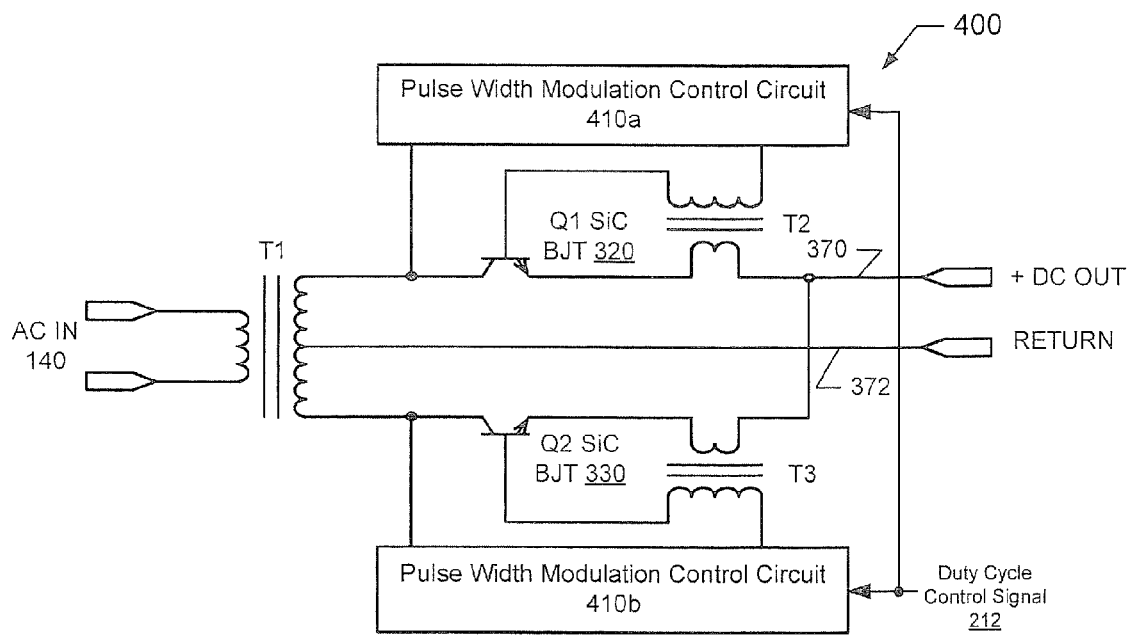
FIG. 4 is a schematic diagram of a full wave rectifier circuit that uses silicon carbide bipolar junction transistors as rectifying elements and that further includes pulse width modulation control in accordance with some embodiments of the present invention.

FIG. 4 is a schematic diagram of another full wave rectifier circuit 400 that may be similar to that shown for the rectifier circuit 300 of FIG. 3, but, in contrast thereto, includes pulse width modulation control circuits 410a and 410b. The pulse width modulation (PWM) control circuits 410a and 410b respond to a duty cycle control signal 412 by regulating a duty cycle between a first mode when the SiC BJT 320 is forward biased (and may be driven into a saturated state) and the other SiC BJT 330 is reverse biased and a second mode when the SiC BJT 320 is reverse biased and the other SiC BJT 330 is forward biased (and may be driven into a saturated state). The PWM control circuits 410a and 410b are connected to control the base to collector biasing of the SiC BJTs 320 and 330 in response to the duty cycle control signal 212. The duty cycle of the SiC BJTs 320 and 330 may be controlled by the PWM control circuits 410a and 410b waiting for the AC signals (e.g., signals at nodes 350) from the transformer (T1) to reach one or more defined threshold values before controlling the SiC BJTs 320 and 330 to switch between the first and second modes.

Although separate PWM control circuits 410a and 410b have been shown in FIG. 4 for ease of illustration, it is to be understood that their functionality may be combined within a single element or spread across more than two circuit elements. Moreover, the PWM control circuits 410a and 410b may operate to replace the second and third transformers T2 and T3.

Figure 5:
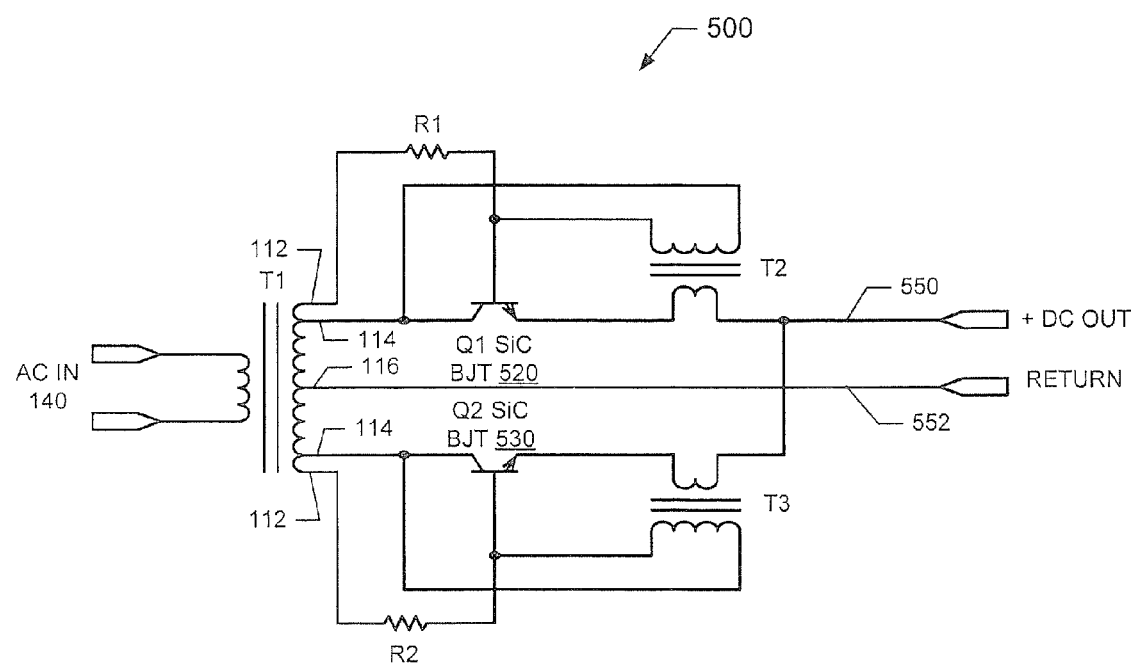
FIG. 5 is a schematic diagram of a full wave rectifier circuit that uses silicon carbide bipolar junction transistors as rectifying elements in accordance with some embodiments of the present invention.

FIG. 5 is a schematic diagram of a full wave rectifier circuit 500 that combines aspects of the full wave rectifier circuit 100 of FIG. 1 and the full wave rectifier circuit 300 of FIG. 3. Referring to FIG. 5, the full wave rectifier circuit 500 includes a pair of SiC BJTs 520 and 530 and three transformers T1, T2, and T3.

The transformer T1 can be configured to operate as described above for the transformer T1 of FIG. 1 and, therefore, can include an output secondary winding with a first pair of tap nodes 112, a second pair of tap nodes 114, and a center tap node 116. The SiC BJTs 520 and 530 can be configured to operate as described above for the SiC BJTs 120 and 130 of FIG. 1 as NPN type transistors. The transformers T2 and T3 can be configured to operate as described above for transformers T2 and T3 of FIG. 3.

In response to the AC input signal 140 being applied to an input primary winding of the transformer T1, the output secondary winding generates a pair of opposite polarity AC signals between the first pair of tap nodes 112 and the center tap node 116, and generates opposite polarity AC signals between the second pair of tap nodes 114 and the center tap node 116. The AC signals between the first tap nodes 112 and the center tap node 116 have a greater voltage range than the AC signals between the second tap nodes 114 and the center tap node 116.

During one half cycle of the AC input signal 140, the tap nodes 112 and 114 of transformer T1 and the output secondary winding of the transformer T2 both provide a positive voltage to forward bias the collector-to-base junction of the SiC BJT 520. This biasing forces SiC BJT 520 into hard saturation and thereby reduces or minimizes the collector-to-emitter voltage of SiC BJT 120. During this one half cycle of the AC input signal 140, the tap nodes 112 and 114 of transformer T1 and the output secondary winding of the transformer T3 both provide a provide a strong negative bias to the emitter-to-base junction and to the collector-to-base junction of SiC BJT 530, thereby forcing it deeply into cutoff. In contrast, during the second half cycle of the AC input signal 140, the tap nodes 112 and 114 of transformer T1 and the output secondary windings of the transformers T2 and T3 reverse this process to force SiC BJT 530 to be driven into hard saturation and to force SiC BJT 520 deeply into cutoff.

For a low current in the AC input signal 130, the resistors R1 and R2 connected between the transformer tap nodes 112 and the base terminals of the SiC BJTs 520 and 530, respectively, are configured to bias the SiC BJTs 520 and 530 into hard saturation. In contrast, for a high current in the AC input signal 130, the transformers T2 and T3 connected between the emitters and bases of the SiC BJTs 520 and 530 are configured to bias the SiC BJTs 520 and 530 into hard saturation. Accordingly, the resistors pairs R1 and R2 and the transformer pairs T2 and T3 cooperatively operate to bias the SiC BJTs 520 and 530 into hard saturation responsive to both low and high current in the AC input signal 130.

The full wave rectifier circuit 500 thereby rectifies the AC input signal 140 to generate a rectified (e.g., DC) signal that is output through the rectified signal output node 550 (e.g., +DC) and is received back through the return rectified signal node 552 (e.g., −DC). The full wave rectifier circuit 500 may be included as part of a power supply to supply a DC signal across nodes 550 and 550 to an external load, such as to electronic circuitry that requires a DC signal for operation. Because the SiC BJTs 120 and 130 are biased using a voltage difference between the tap nodes 112 and 114 and across the transformers T2 and T3 connected to the rectified signal output node 550, the rectifier circuit 100 may be particularly suited for generating lower and high current rectified signals.

Figure 6:
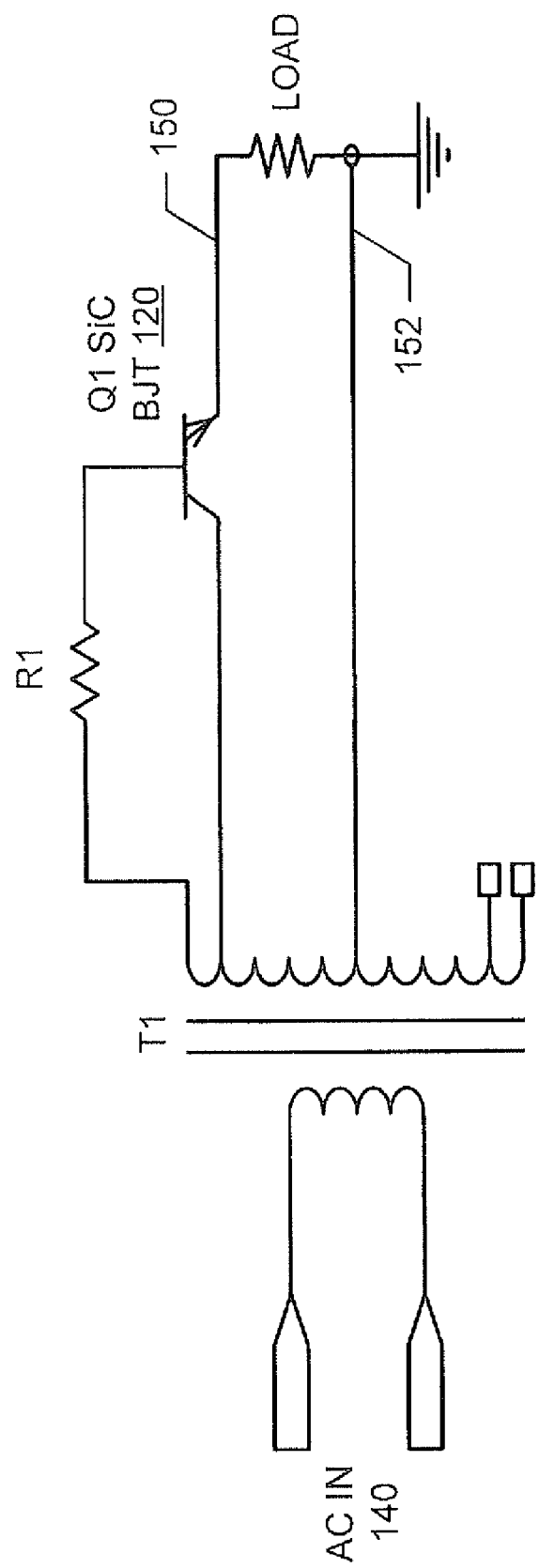
FIG. 6 is a schematic diagram of an exemplary half wave portion of the full wave rectifier circuit of FIG. 1.
Figure 7:
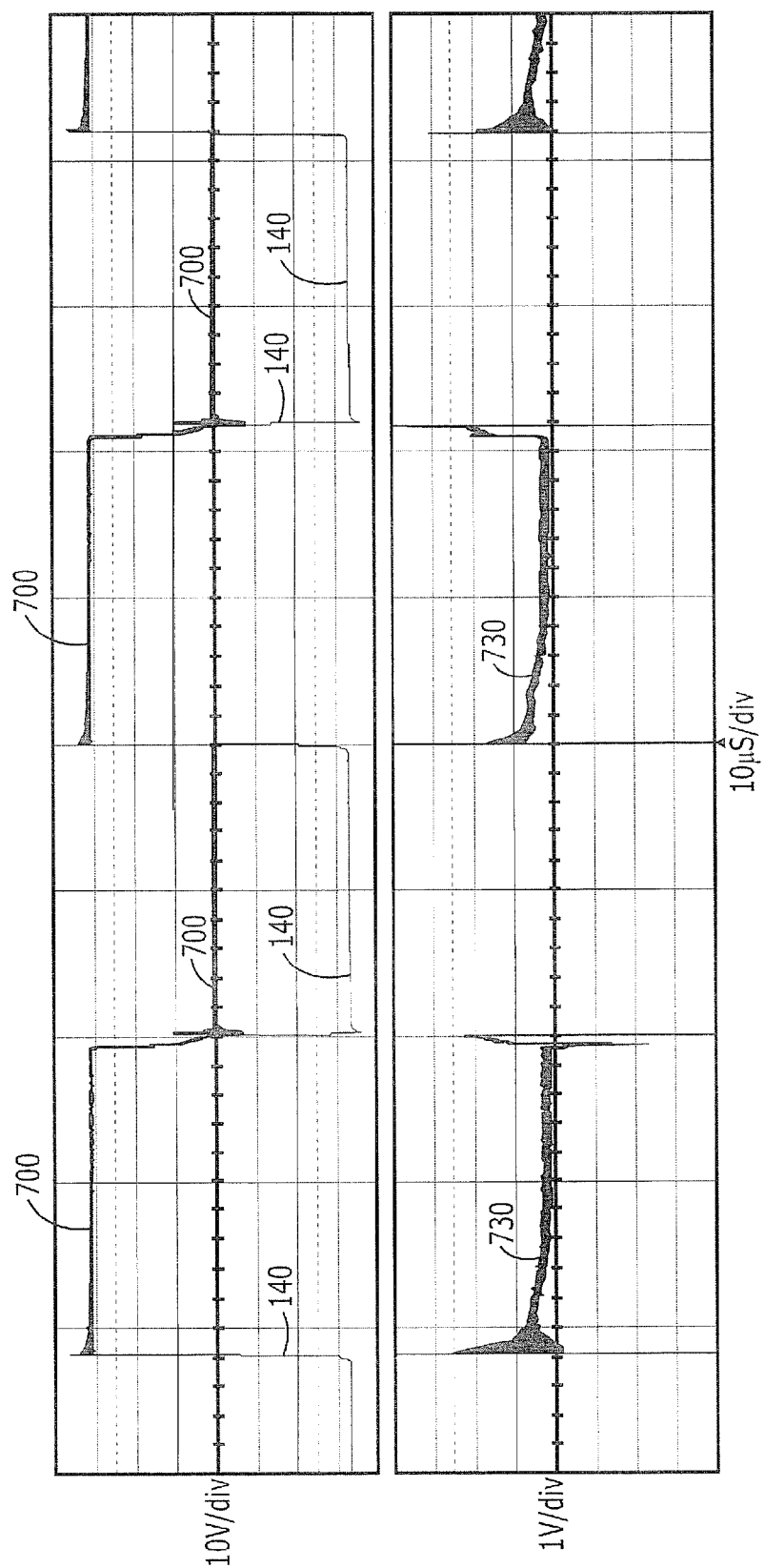
FIG. 7 is a graph of a measured rectified output signal of the circuit of FIG. 6 according to some embodiments.

FIG. 6 is a schematic diagram of an exemplary half wave portion of the full wave rectifier circuit 100 of FIG. 1. FIG. 7 is a graph of the AC input signal 140 and the rectified output voltage that may be generated across a load "LOAD" by the half wave portion of the full wave rectifier circuit of FIG. 6 according to some embodiments. Referring to FIGS. 6 and 7, the upper graph illustrates an exemplary AC input signal 140 and the corresponding rectified output voltage 700 that may be generated across the rectified signal output and return nodes 150 and 152 to the load by the half wave portion of the full wave rectifier circuit of FIG. 6. The lower graph illustrates a difference between the rectified output voltage 700 and the AC input signal 140. As shown, the rectified output voltage 700 closely tracks the AC input signal 140 during each half cycle of the AC input signal 140 where the SiC BJT 120 is forward biased into hard saturation. Moreover, it is observed that the rectifier circuit of FIG. 6 rapidly transitions the SiC BJT 120 from the reversed biased cutoff mode to the forward biased saturation mode in response to the AC input signal 140 becoming a positive voltage. Consequently, the rectifier circuit of FIG. 6 demonstrates high efficiency in its rectification of the AC input signal 140.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A rectifier circuit comprising:
a transformer that is connected to respond to an alternating current (AC) input signal by generating a first pair of opposite polarity AC signals and a second pair of opposite polarity AC signals, wherein the first pair of AC signals has a greater voltage range than the second pair of AC signals;
first and second bipolar junction transistors (BJTs) each including an input terminal connected to receive a different one of the second pair of opposite polarity AC signals, a base terminal connected to receive a different one of the first pair of opposite polarity AC signals, and an output terminal connected to a rectified signal output node of the rectifier circuit; and
a pulse width modulation circuit that is configured to control biasing of the first and second BJTs responsive to a duty cycle control signal to regulate a duty cycle between a first mode when the first BJT is forward biased and the second BJT is reverse biased and a second mode when the first BJT is reverse biased and the second BJT is forward biased.

2. The rectifier circuit of claim 1, wherein:
the first and second BJT are SiC BJTs on a silicon carbide (SiC) substrate; and
the first and second pairs of opposite polarity AC signals from the transformer are configured to saturate the first SiC BJT while reverse biasing the second SiC BJT during a major portion of a first half cycle of the AC input signal, and to reverse bias the first SiC BJT while saturating the second SiC BJT during a major portion of a second half cycle of the AC input signal.

3. The rectifier circuit of claim 2, wherein:
the first and second SiC BJT are NPN type transistors with collector terminals as the input terminals and emitter terminals as the output terminals.

4. The rectifier circuit of claim 3, wherein:
the first and second pairs of opposite polarity AC signals generate base to emitter voltages on the first and second SiC BJTs within a range of −5V to +5V during cycles of the AC input signal.

5. The rectifier circuit of claim 1, wherein:
the transformer has an input primary winding connected to receive the AC input signal and an output secondary winding with first and second pairs of tap nodes that respectively generate the first and second pairs of AC signals.

6. The rectifier circuit of claim 5, wherein:
the output secondary winding of the transformer further comprises a center tap node that receives a returned rectified signal for the rectifier circuit.

7. The rectifier circuit of claim 6, wherein:
the first pair of tap nodes of the output secondary winding are configured to generate the first pair of AC signals with about an equal voltage range relative to a voltage of the center tap node; and
the second pair of tap nodes of the output secondary winding are configured to generate the second pair of AC signals with about an equal voltage range relative to the voltage of the center tap node, wherein the voltage range of the second pair of tap nodes is smaller than the voltage range of the first pair of tap nodes.

8. The rectifier circuit of claim 1, wherein:
the pulse width modulation circuit is further configured to control a bias voltage between the input terminal and the base terminal of each of the first and second BJTs in response to the duty cycle control signal.

9. The rectifier circuit of claim 1, wherein:
the pulse width modulation circuit is further configured to control biasing of the first and second BJTs responsive to comparison of the first pair of AC signals to at least one threshold value.

10. A rectifier circuit comprising:
first and second silicon carbide (SiC) bipolar junction transistors (BJTs) on a SiC substrate, the first and second SiC BJTs each including an input terminal, a base terminal, and an output terminal;
a first transformer that is connected to respond to an alternating current (AC) input signal by generating a pair of opposite polarity AC signals, wherein the input terminals of the first and second SiC BJTs are connected to receive a different one of the opposite polarity AC signals from the first transformer;
a second transformer that is connected to respond to a signal from the output terminal of the first SiC BJT by generating a voltage across the base terminal and the input terminal of the first SiC BJT; and
a third transformer that is connected to respond to a signal from the output terminal of the second SiC BJT by generating a voltage across the base terminal and the input terminal of the second SiC BJT, wherein the output terminals of the first and second SiC BJTs are connected through the second and third transformers to a rectified signal output node of the rectifier circuit.

11. The rectifier circuit of claim 10, wherein:
the first transformer includes an input primary winding connected to receive the AC input signal and an output secondary winding having a center tap node and a pair of output nodes that respectively generate the pair of opposite polarity AC signals relative to the center tap node.

12. The rectifier circuit of claim 10, wherein:
the second transformer includes an input primary winding connected between the output terminal of the first SiC BJT and the rectified signal output node of the rectifier circuit, and an output secondary winding connected between the base terminal and the input terminal of the first SiC BJT; and the third transformer includes an input primary winding connected between the output terminal of the second SiC BJT and the rectified signal output node of the rectifier circuit, and an output secondary winding connected between the base terminal and the input terminal of the second SiC BJT.

13. The rectifier circuit of claim 10, wherein:
the first, second, and third transformers are configured to saturate the first SiC BJT while reverse biasing the second SiC BJT during a major portion of a first half cycle of the AC input signal, and to reverse bias the first SiC BJT while saturating the second SiC BJT during a major portion of a second half cycle of the AC input signal.

14. The rectifier circuit of claim 10, wherein:
the first and second SiC BJT are NPN type transistors with collector terminals as the input terminals and emitter terminals as the output terminals.

15. The rectifier circuit of claim 14, wherein:
the first, second, and third transformers are configured to generate base to emitter voltages on the first and second SiC BJTs within a range of −5V to +5V during cycles of the AC input signal.

16. The rectifier circuit of claim 10, further comprising:
a pulse width modulation circuit that is configured to respond to a duty cycle control signal by regulating a duty cycle between a first mode when the first SiC BJT is forward biased and the second SiC BJT is reverse biased and a second mode when the first SiC BJT is reverse biased and the second SiC BJT is forward biased.

17. A rectifier circuit comprising:
first and second silicon carbide (SiC) bipolar junction transistors (BJTs) on a SiC substrate, the first and second SiC BJTs each including an input terminal, a base terminal, and an output terminal;
a first transformer that responds to an alternating current (AC) input signal by generating a first pair of opposite polarity AC signals and a second pair of opposite polarity AC signals, wherein the first pair of AC signals has a greater voltage range than the second pair of AC signals, wherein the input terminals of the first and second SiC BJTs are connected to receive a different one of the second pair of opposite polarity AC signals, and the base terminals of the first and second SiC BJTs are connected to receive a different one of the first pair of opposite polarity AC signals;

a second transformer that is connected to respond to a signal from the output terminal of the first SiC BJT by generating a voltage across the base terminal and the input terminal of the first SiC BJT; and a third transformer that is connected to respond to a signal from the output terminal of the second SiC BJT by generating a voltage across the base terminal and the input terminal of the second SiC BJT, wherein the output terminals of the first and second SiC BJTs are connected through the second and third transformers to a rectified signal output node of the rectifier circuit.

18. The rectifier circuit of claim 17, wherein:
the first transformer includes an input primary winding connected to receive the AC input signal and an output secondary winding having a center tap node and a pair of output nodes that respectively generate the pair of opposite polarity AC signals relative to the center tap node.

19. The rectifier circuit of claim 17, wherein:
the second transformer includes an input primary winding connected between the output terminal of the first SiC BJT and the rectified signal output node of the rectifier circuit, and an output secondary winding connected between the base terminal and the input terminal of the first SiC BJT; and the third transformer includes an input primary winding connected between the output terminal of the second SiC BJT and the rectified signal output node of the rectifier circuit, and an output secondary winding connected between the base terminal and the input terminal of the second SiC BJT.

20. The rectifier circuit of claim 17, wherein:
the first, second, and third transformers are configured to saturate the first SiC BJT while reverse biasing the second SiC BJT during a major portion of a first half cycle of the AC input signal, and to reverse bias the first SiC BJT while saturating the second SiC BJT during a major portion of a second half cycle of the AC input signal.

21. The rectifier circuit of claim 17, wherein:
the first and second SiC BJT are NPN type transistors with collector terminals as the input terminals and emitter terminals as the output terminals.

* * * * *

UNITED STATES PATENT AND TRADEMARK OFFICE
CERTIFICATE OF CORRECTION

| | | |
|---|---|---|
| PATENT NO. | : 8,218,345 B2 | Page 1 of 1 |
| APPLICATION NO. | : 12/408304 | |
| DATED | : July 10, 2012 | |
| INVENTOR(S) | : Callanan et al. | |

It is certified that error appears in the above-identified patent and that said Letters Patent is hereby corrected as shown below:

On the Title Page:
Item (56) References Cited: add
            FOREIGN PATENT DOCUMENTS
            GB   851,375   10/1960

Signed and Sealed this
Thirtieth Day of April, 2013

Teresa Stanek Rea
*Acting Director of the United States Patent and Trademark Office*